(12) United States Patent
Rolette et al.

(10) Patent No.: US 9,460,289 B2
(45) Date of Patent: Oct. 4, 2016

(54) SECURING A VIRTUAL ENVIRONMENT

(75) Inventors: James Rolette, Round Rock, TX (US);
Edward Ross, Cedar Park, TX (US);
Damon Fleury, Cedar Park, TX (US)

(73) Assignee: Trend Micro Incorporated, Tokyo (JP)

( * ) Notice: Subject to any disclaimer, the term of this patent is extended or adjusted under 35 U.S.C. 154(b) by 1096 days.

(21) Appl. No.: 13/030,360

(22) Filed: Feb. 18, 2011

(65) Prior Publication Data
US 2012/0216273 A1    Aug. 23, 2012

(51) Int. Cl.
*G06F 21/57* (2013.01)
*H04L 12/46* (2006.01)
*H04L 29/06* (2006.01)

(52) U.S. Cl.
CPC .......... *G06F 21/577* (2013.01); *H04L 12/4641* (2013.01); *H04L 63/0209* (2013.01); *H04L 63/0227* (2013.01); *G06F 2221/033* (2013.01)

(58) Field of Classification Search
CPC ........... H04L 63/0227; H04L 63/0209; G06F 21/577; G06F 2221/033
USPC ...................................... 726/22–25; 713/188
See application file for complete search history.

(56) References Cited

U.S. PATENT DOCUMENTS

| | | | |
|---|---|---|---|
| 7,107,613 B1 * | 9/2006 | Chen ........................ | H04L 67/14 709/241 |
| 7,797,748 B2 * | 9/2010 | Zheng et al. ................... | 726/24 |
| 7,996,836 B1 * | 8/2011 | McCorkendale et al. ........ | 718/1 |
| 8,010,667 B2 * | 8/2011 | Zhang et al. ................. | 709/224 |
| 8,074,276 B1 * | 12/2011 | Beloussov et al. ............. | 726/22 |
| 8,166,474 B1 * | 4/2012 | Delco et al. ...................... | 718/1 |
| 8,341,749 B2 * | 12/2012 | Rogel .............................. | 726/25 |
| 8,634,437 B2 * | 1/2014 | Wu ..................... | H04L 67/2804 370/432 |
| 2003/0182423 A1 * | 9/2003 | Shafir ..................... | H04L 63/02 709/225 |
| 2005/0216759 A1 * | 9/2005 | Rothman et al. ............. | 713/200 |
| 2006/0031476 A1 * | 2/2006 | Mathes et al. ................. | 709/224 |
| 2008/0148341 A1 * | 6/2008 | Ferguson et al. .................. | 726/1 |
| 2008/0320594 A1 * | 12/2008 | Jiang ............................... | 726/24 |
| 2009/0073895 A1 * | 3/2009 | Morgan et al. ............... | 370/255 |
| 2009/0254990 A1 * | 10/2009 | McGee ............................ | 726/22 |
| 2010/0043073 A1 * | 2/2010 | Kuwamura ...................... | 726/24 |
| 2010/0064369 A1 * | 3/2010 | Stolfo et al. .................... | 726/24 |
| 2010/0100718 A1 * | 4/2010 | Srinivasan ........................ | 713/1 |
| 2010/0306849 A1 * | 12/2010 | Zheng et al. ................... | 726/24 |
| 2011/0209215 A1 * | 8/2011 | Kabbara .......................... | 726/22 |
| 2012/0240182 A1 * | 9/2012 | Narayanaswamy et al. ..... | 726/1 |
| 2012/0297057 A1 * | 11/2012 | Ghosh et al. ................. | 709/224 |

OTHER PUBLICATIONS

Weaver, Nicholas, Vern Paxson, and Jose M. Gonzalez. "The shunt: an FPGA-based accelerator for network intrusion prevention." Proceedings of the 2007 ACM/SIGDA 15th international symposium on Field programmable gate arrays. ACM, 2007. (pp. 199-206).*

Dzung, Dacfey, et al. "Security for industrial communication systems." Proceedings of the IEEE 93.6 (2005): 1152-1177.*

* cited by examiner

*Primary Examiner* — Kari Schmidt
(74) *Attorney, Agent, or Firm* — Okamoto & Benedicto LLP

(57) ABSTRACT

Securing a virtual environment includes: in a host device, intercepting a packet addressed to a virtual machine implemented by the host device; redirecting the packet to a security device external to the host device through an egress tunnel; and delivering the packet to the virtual machine if the host device receives an indication from the security device that the packet is approved.

9 Claims, 9 Drawing Sheets

SECURING A VIRTUAL ENVIRONMENT

BACKGROUND

The use of virtual environments continues to increase in the information technology marketplace. In a virtual environment, a host hardware platform can implement multiple virtual machines through the use of hypervisor software running on the host platform. Each virtual machine imitates some or all of the hardware functionality of a separate physical machine. In this way, a host platform implementing multiple virtual machines over shared hardware can provide many advantages, including increased hardware utilization, reduced capital costs, and the ability of a single host platform to independently support different types of operating systems.

The density of virtual machines sharing the same virtual environment can pose problems in securing the virtual environment from network threats. To ensure the security of the virtual machines in a virtual environment, administrators may wish to enforce packet-level security policies on network packets transmitted to or from virtual machines in the virtual environment. One approach to enforcing such policies has been to incorporate a separate virtual appliance into the virtual environment, implemented at the hypervisor level, which inspects network traffic to and from the virtual machines and enforces security policies with respect to the network traffic. However, if a desired level of network security utilizes a significant amount of processing resources, such as in the case of Deep Packet Inspection (DPI) policies, this approach may pose a substantial performance burden on the host platform, thereby reducing the number of virtual machines that may be implemented by the host platform.

BRIEF DESCRIPTION OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

Figure 1:
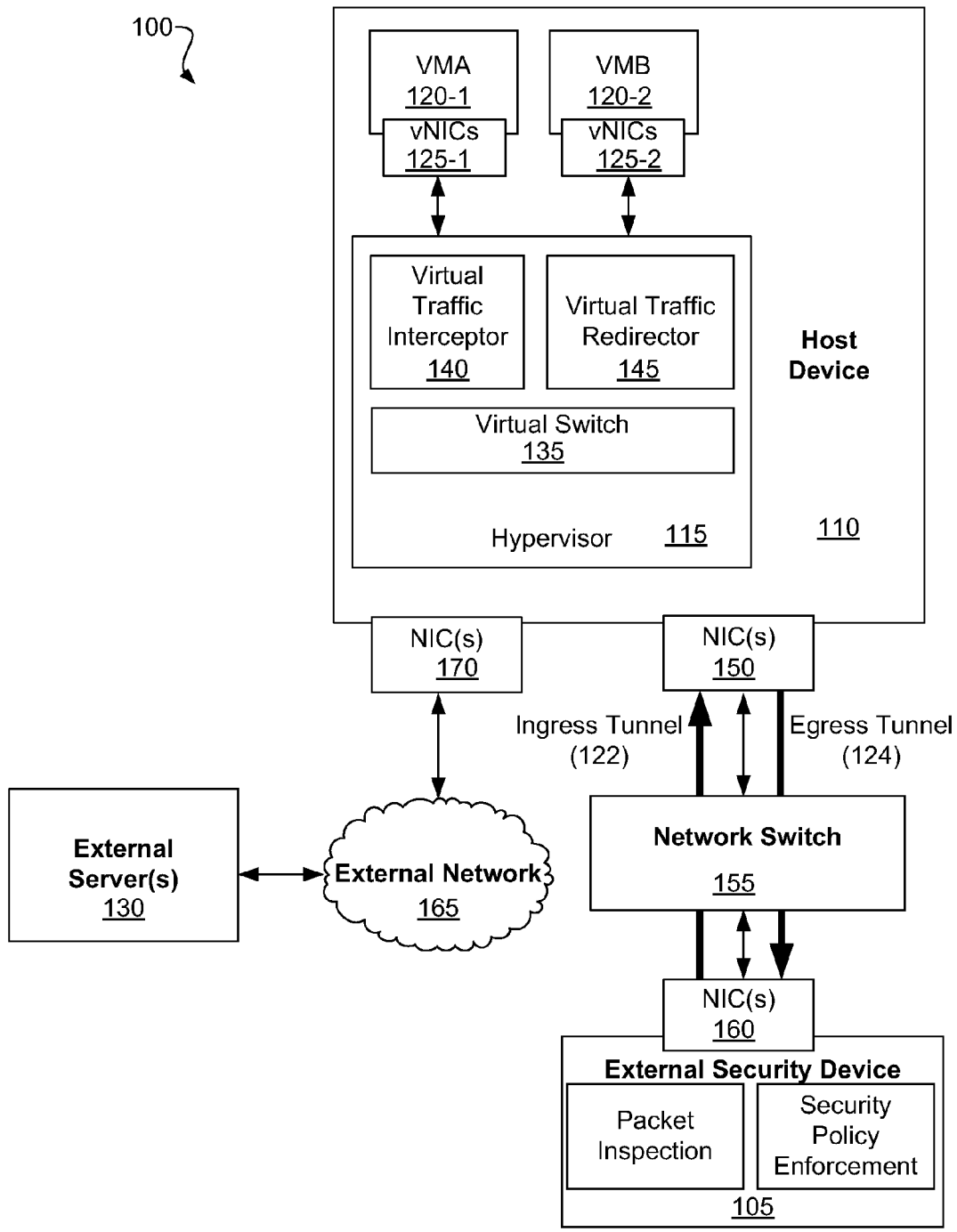
FIG. 1 is a block diagram of an illustrative virtual environment secured by an external security device, according to one example of principles described herein.

The present specification describes methods, systems, and computer program products through which packet, flow and application level security in a virtual environment may be implemented at the hypervisor level by offloading select network traffic from the host machine to an external network security device. This approach allows a virtual environment to benefit from offloading resource-intensive network security to special purpose security appliances.

In particular, the present specification describes a method of securing a virtual environment in which a host device intercepts a packet addressed to a virtual machine implemented by the host device; redirects the packet to a security device external to the host device through an egress tunnel; and delivers the packet to an intended destination of the packet if the host device receives an indication from the security device that the packet is approved.

The present specification also describes a method of securing a virtual environment in which a security device external to a host device receives from the host device over an egress tunnel associated with the host device a redirected packet intended for a virtual machine implemented by the host device. The security device determines whether the packet is permissible based on a security policy and returns the packet to the host device over an ingress tunnel associated with the host device if the packet is permissible.

Furthermore, the present specification describes a system including a processor communicatively coupled to a memory. The processor executes hypervisor code stored on the memory to implement a virtual machine; intercept a packet addressed to the virtual machine; determine whether the packet is selected for inspection; if the packet is selected for inspection, redirect the packet to a security device external to the processor through an egress tunnel; and deliver the packet to the virtual machine if the packet is returned to the processor from the security device through an ingress tunnel.

As used in the present specification and in the appended claims, the word "virtual machine" means a software implementation of a programmable machine.

As used in the present specification and in the appended claims, the word "host device" means a machine or system having the hardware platform used to implement at least one virtual machine.

As used in the present specification and in the appended claims, the word "virtual environment" refers collectively to the hardware and software used to implement at least one virtual machine on at least one host device.

As used in the present specification and in the appended claims, the word "packet" means a block of data formatted for transmission to an addressable entity over a network.

As used in the present specification and in the appended claims, the word "flow" represents a succession of packets transmitted between two network endpoints with a specific application purpose. In the OSI Model, a network flow would be considered a transport level (layer 4) session and is commonly implemented via unique TCP or UDP ports.

As used in the present specification and in the appended claims, the phrase "application session" represents the use of a flow or multiple flows for a specific purpose by an application. For example, an application session may use multiple flows to access database information, a web-page or any network based information. An application session represents the use of a flow or collection of flows by any software which intends to operate above Layer 4 in the OSI Model.

As used in the present specification and in the appended claims, the word "tunnel" refers to a protocol implemented pathway for transmitting a packet to a destination other than a destination specified in the packet or from a source other than a source specified in the packet.

As used in the present specification and in the appended claims, the word "external," when describing a computer-implemented machine or device, refers to a machine or device that is implemented by a physically distinct processor. For example, a security device that is external to a host device is implemented by a processor that is physically distinct from the processor(s) used to implement the host device.

As used in the present specification and in the appended claims, the word "processor" refers to a hardware apparatus capable of executing code. A processor may include multiple central processing units.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

With specific reference now to the appended figures, FIG. 1 shows a block diagram of an illustrative system (100) in which a virtual environment is secured using, at least in part, an external security device (105). The virtual environment includes a host device (110) which provides the hardware which runs a hypervisor program (115). The hypervisor program (115) enables the implementation of a first virtual machine (120-1) and a second virtual machine (120-2). Each of the virtual machines (120-1, 120-2) may include one or more virtual network interface controllers (vNICs) (125-1, 125-2) to allow the virtual machines (120-1, 120-2) to send and receive packets over one or more networks. For example, packets may be sent between the virtual machines (120-1, 120-2) or between a virtual machine (120-1, 120-2) and a machine external to the host device (110), such as an external server (130).

The host devices described in FIG. 1 and elsewhere in the present specification may be implemented with any available software package (commercial or freely available) which supports the execution of additional operating systems within virtual machines. Examples of suitable software packages that may be used to create virtualized environments include, but are not limited to VMWare, Microsoft Hyper-V, and Xen virtualization software packages.

As described above, previous virtualized environments may employ packet-level security policy using a virtual security appliance implemented at the hypervisor level. However, especially in cases requiring deep packet inspection (DPI) to implement network security policies, this approach can utilize a significant amount of resources from the host device (110), thereby reducing the number of virtual machines that the host device (110) may host and degrading the performance of those virtual machines (120-1, 120-2) that the host device (110) is able to host.

By contrast, the example system (100) of FIG. 1 relies on the external security device (105) to perform packet, flow or application session inspection and enforce security policies defined for the system (100). By performing the resource-intensive tasks of packet inspection and security policy enforcement in a device (105) external to the host device (110), the resources of the host device (110) may be conserved and dedicated to the virtual machines (120-1, 120-2) it hosts.

The host device (110) may offload these processor-intensive tasks to the external security device (105) by utilizing one or more tunneling protocols to establish an ingress tunnel (122) and an egress tunnel (124) between the host device (110) and the external security device (105). Any tunneling protocol(s) may be used to establish these tunnels, as may best suit a particular example of the principles described herein. Examples of suitable tunneling protocols include, but are not limited to, Virtual Local Area Network (VLAN) tunneling, Virtual Private Network (VPN) tunneling, Generic Routing Encapsulation (GRE) tunneling, and tunneling based on the Institute of Electrical and Electronics Engineers (IEEE) 802.1ah standard. The specific tunnel protocol used may be tailored to the capabilities of the external security device (105), the host device (110) and the network infrastructure they are using.

Using the egress tunnel (124), the host device (110) can divert network traffic to or from virtual machines (120-1, 120-2) to the external security device (105), which performs packet inspection and enforces security policies for the system (100). Packets permitted by the external security policies of the system (100) are returned by the external security device (105) to the host device (110) over the ingress tunnel, where the host device (110) delivers the packets to the virtual machine(s) (120-1, 120-2) or external server (130) to which they are addressed.

In addition to implementing the virtual machines (120-1, 120-2), the hypervisor (115) of the host device (110) runs a virtual switch module (135), a virtual traffic interceptor module (140) and a virtual traffic redirector module (145). The virtual switch module (135) operates to direct packets to and from the virtual machines (120-1, 120-2). In certain examples, the functionality of the virtual traffic interceptor (140) and virtual traffic redirector (145) may be implemented as a single module.

The operation and interaction of the virtual traffic interceptor and redirector modules (140, 145) can be illustrated by considering the process by which the first virtual machine (120-1) sends a packet to the second virtual machine (120-2). Once the virtual NIC (125-1) of the first virtual machine (120-1) transmits the packet, the virtual traffic interceptor module (140) intercepts the packet and determines whether the packet is selected for inspection. This determination may be based on policy. In some examples, the selection of a packet for inspection may be based on a regular pattern (e.g., every n packet is selected for inspection, where n is an integer) and/or a random pattern (e.g., random selection of packets for inspection). Additionally or alternatively, the selection of a packet for inspection may be based on the content in the header of the packet (e.g., address of sender, address of intended recipient, length of the packet, the packet type, the flow identifier, the application type, etc.), attributes of the source or recipient virtual machine, and/or any other criterion that may suit a particular application of the principles described herein. Additionally or alternatively, the policy may determine that a packet is selected for inspection based on whether the packet was already received from the external security device (e.g., a policy that any packet already received from the external security device is not selected for inspection, and/or a policy that any packet not received from the external security device is selected for inspection). In some policy examples, multiple criteria may be weighed to determine whether the packet is of sufficient interest to be selected for inspection by the external security device.

If the packet is selected for inspection, the virtual traffic redirector module (145) redirects the packet from a NIC (150) of the host device (110), over a network switch (155) to a NIC (160) of the external security device (105) using the egress tunnel (124). Once received by the NIC (160) of the external security device (105), the external security device (105) inspects the packet and determines whether the packet is permitted by the security policy or policies in place for the system (100). In alternative examples, the network switch (165) may represent the use of multiple network infrastructure devices (switches, routers, bridges) or may not be used at all, allowing the host device NIC (150) to direct connect to the NIC (160) of the external security device (105).

If the security policy or policies in place for the system (100) do not allow the packet, the external security device (105) drops the packet such that the packet is never returned to the host device (110) or delivered to the second virtual machine (120-2). On the other hand, if the security policy or policies in place for the system (100) allow the packet, the external security device (105) returns the packet to the host device (110) over the ingress tunnel (122). Once the packet is received in the hypervisor (115), the virtual traffic interceptor module (140) will recognize the packet as permissible under security policy due to the fact that the packet was received over the ingress tunnel (122). Accordingly, the virtual switch module (135) delivers the packet to the second virtual machine (120-2).

The external security device (105) may also monitor, inspect, and enforce security policies on packets exchanged between the virtual machines (120-1, 120-2) and devices external to the network defined by the network switch (155) shown in FIG. 1. One way of accomplishing this functionality is to configure the policy of the Virtual Traffic Interceptor (140) to select traffic which is transmitted between the virtual machines (120-1, 120-2) and any device on an External Network (165) using a connected Network Interface Controller (170).

For example, if the first virtual machine (120-1) transmits a packet intended for a server (130) available over an external network (165) (e.g., the Internet), if the virtual traffic interceptor (140) is configured to do so, then the packet may first be redirected by the virtual traffic redirector (145) to the external security device (105) via the egress tunnel (124). As in the earlier example, if the packet is permissible under the security policies of the system (100), then it will be returned via the ingress tunnel where the virtual traffic redirector (145) may allow the packet to be transmitted to the External server (130).

Similarly, if the virtual traffic interceptor (140) receives a packet addressed to the first virtual machine (120-1) from an external server (130) and selects to inspect the packet, the virtual traffic redirector (145) will forward the packet, via the egress tunnel (124) to the external security device (105). If the received packet complies with security policy, the external security device (105) returns the packet via the ingress tunnel (122) and the virtual traffic redirector (145) transmits the packet to the initially targeted virtual machine (120-1).

Depending upon the configuration of the system (100), an implementation may not elect to inspect traffic between the devices of external networks (165) and virtual machines (120-1, 120-2), instead deploying additional instances of external security devices to protect virtual hosts from network traffic of external networks (165). Such deployment would be supplemental to the system (100) described herein.

Figure 2:
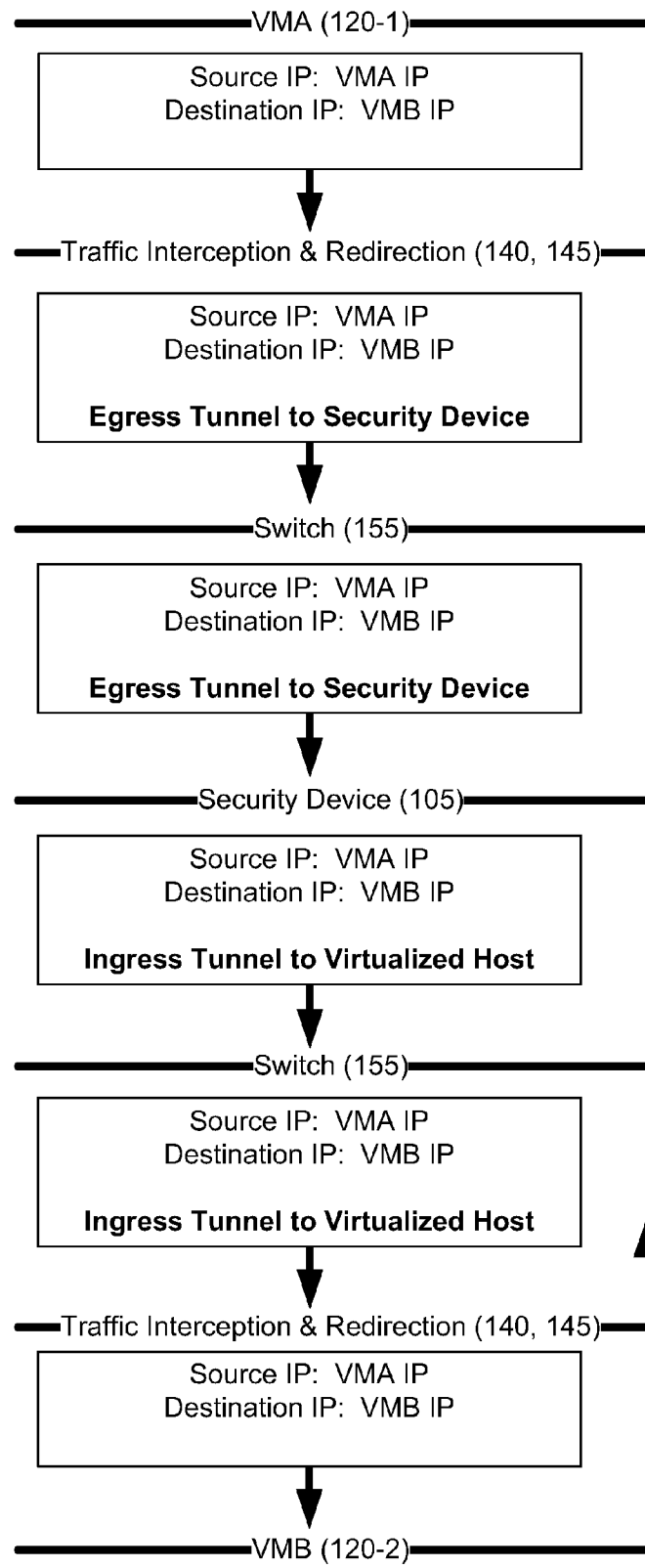
FIG. 2 is a diagram of an illustrative path taken by a packet transmitted between virtual machines in a virtual environment, according to one example of principles described herein.

FIG. 2 is a diagram of an illustrative path taken by a packet transmitted from the first virtual machine (120-1) of FIG. 1 to the second virtual machine (120-2) of FIG. 1 if the packet is selected for inspection by the external security device (105). The packet designates the Internet Protocol (IP) address of the first virtual machine (120-1) as its source and the IP address of the second virtual machine (120-2) as its destination. The packet originates at the first virtual machine (120-1), is intercepted at the traffic interception and redirection modules (140, 145), which directs the packet into the egress tunnel (124) to the external security device. Continuing along the egress tunnel (124), the packet is directed by the switch (155) to the security device (105). The security device (105), upon finding the packet to be permissible based on security policy, places the packet in the ingress tunnel where it is received by the switch and directed back to the host device (110). The traffic interception and redirection modules (140, 145) of the host device (110) recognize that the packet has been returned on the ingress tunnel (i.e. permitted by the external security device) and directs the packet to the second virtual machine (120-2). Alternately, if the security device (105) determines that the packet was outside of security policy, then the packet would not be returned via the ingress tunnel.

Figure 3:
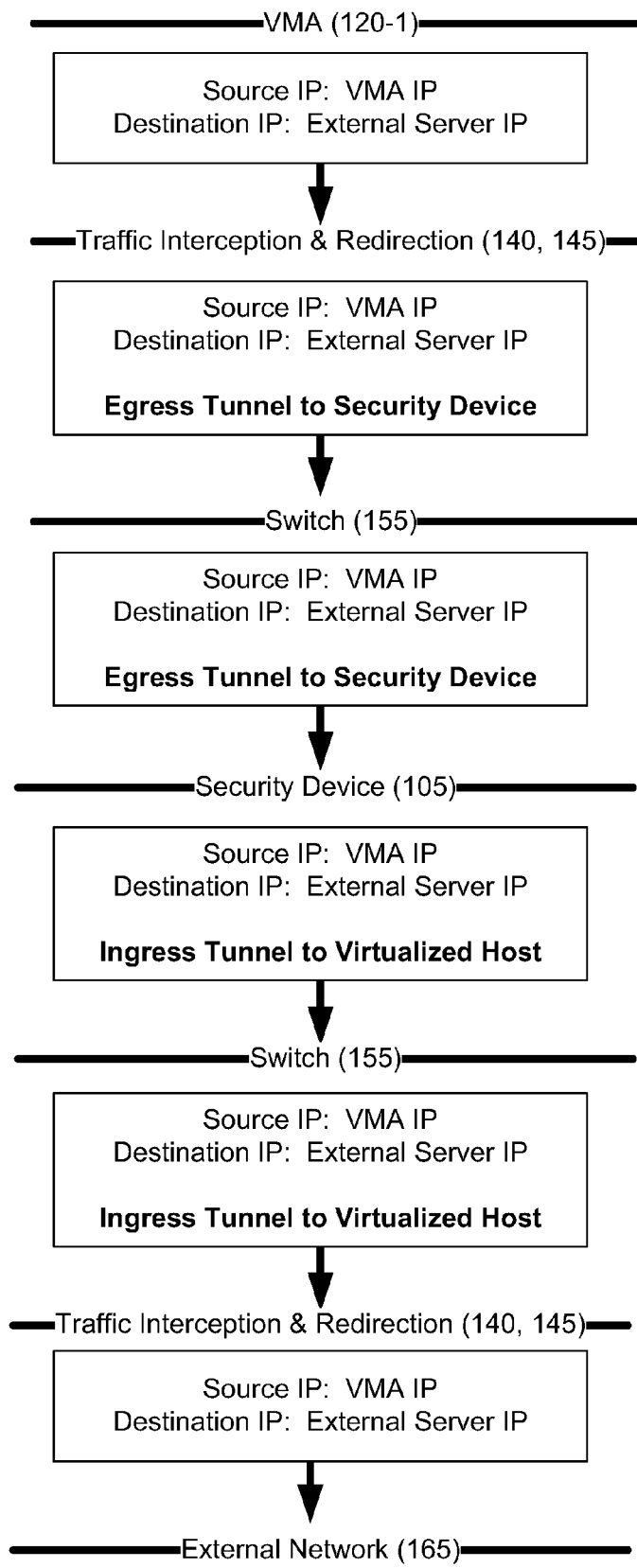
FIG. 3 is a diagram of an illustrative path taken by a packet transmitted from a virtual machine in a virtual environment to an external server, according to one example of principles described herein.

FIG. 3 is a diagram of an illustrative path taken by a packet transmitted from the first virtual machine (120-1) of FIG. 1 to the external server (130) of FIG. 1. The first virtual machine (120-1) encapsulates a layer 3 Internet Protocol (IP) packet in a layer 2 Media Access Control (MAC) packet. The layer-2 packet is intercepted at the traffic interception & redirection modules (140, 145) of the host device (110), which directs the packet, via the egress tunnel (124) to the switch (155) and then to the security device (105). The security device (105), upon finding the packet to be permissible based on security policy, places the packet in the ingress tunnel (122) where it is received by the switch and directed back to the host device (110). The traffic interception and redirection modules (140, 145) of the host device (110) recognize that the packet has been returned on the ingress tunnel (122) (i.e. permitted by the external security device) and directs the packet over a NIC (170) to the external network (165), where it will eventually reach the external server (130).

Alternately, if the security device (105) determines that the packet was outside of security policy, then the packet would not be returned via the ingress tunnel.

Figure 4:
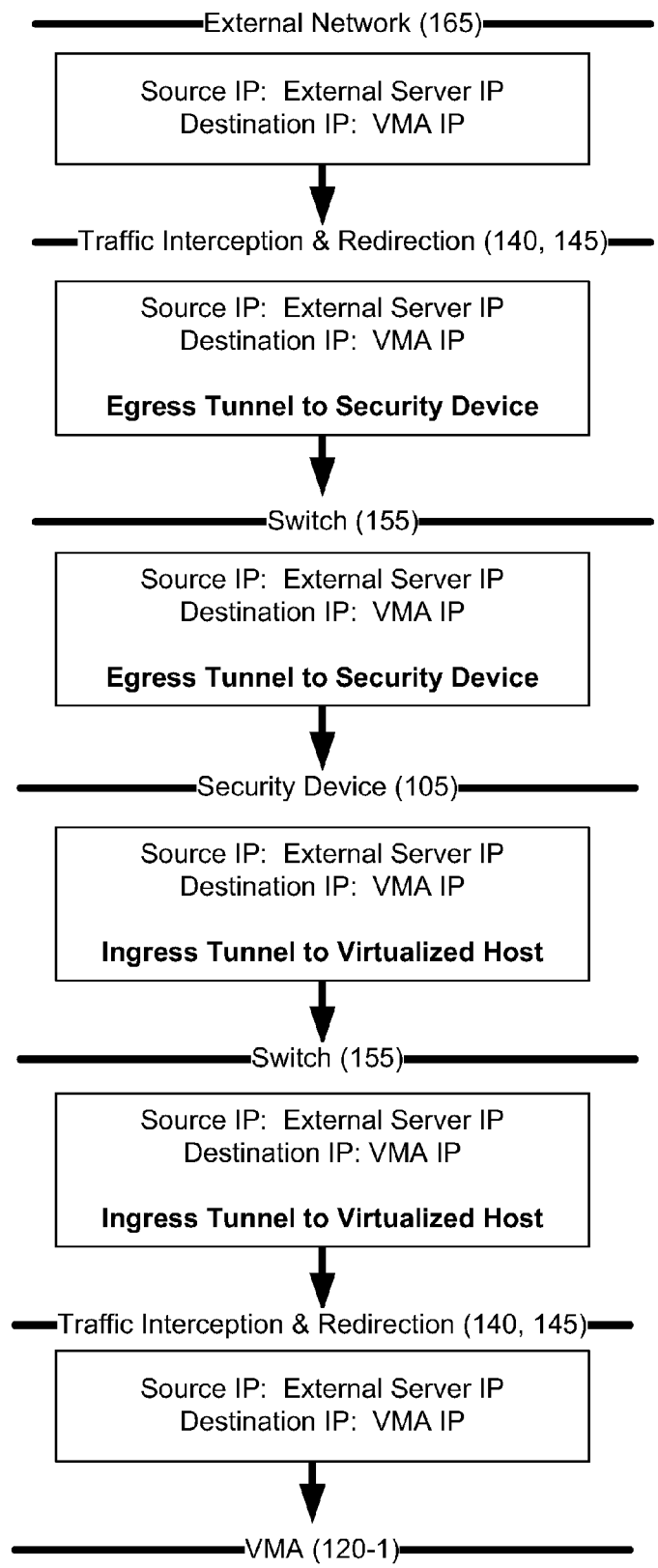
FIG. 4 is a diagram of an illustrative path taken by a packet transmitted from an external server to a virtual machine in a virtual environment, according to one example of principles described herein.

FIG. 4 is a diagram of an illustrative path taken by a packet transmitted from the external server (130) of FIG. 1 to the first virtual machine (120-1) of FIG. 1. The server (130) transmits an IP packet to the IP address of the first virtual machine (120-1). This IP packet is intercepted by the traffic interception and redirection modules (140, 145), which directs the packet, via the egress tunnel (124) to the switch (155) and then to the security device (105). The security device (105), upon finding the packet to be permissible based on security policy, places the packet in the ingress tunnel (122) where it is received by the switch and directed back to the host device (110). The traffic interception and redirection modules (140, 145) of the host device (110) recognize that the packet has been returned on the ingress tunnel (122) (i.e. permitted by the external security device) and directs the packet over a NIC (170) to the external network (165), where it will eventually reach the external server (130).

Alternately, if the security device (105) determines that the packet was outside of security policy, then the packet would not be returned via the ingress tunnel.

Figure 5:
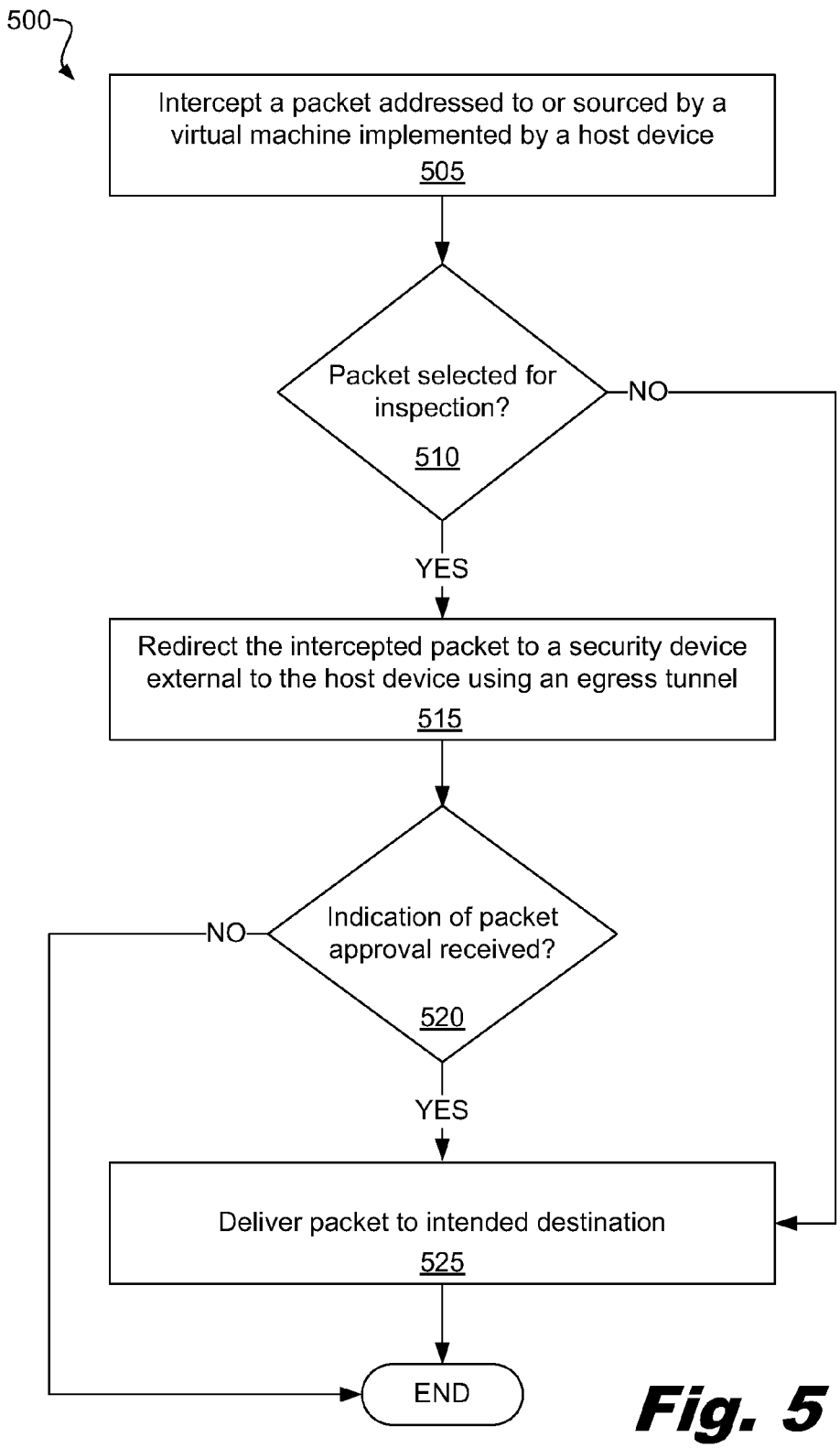
FIG. 5 is a flowchart diagram of an illustrative method of securing a virtual environment, according to one example of principles described herein.

FIG. 5 is a flowchart of an illustrative method (500) of securing a virtual environment according to the above principles. The method (500) of FIG. 5 may be performed, for example, by a host device which implements multiple virtual machines. In the method (500), a packet intended for or sent by a virtual machine implemented by the host device is intercepted (block 505), and a determination (block 510) is made as to whether the packet is selected for inspection by an external security device.

As described above, this decision may be made based on any criterion or set of criteria that may suit a particular application of these principles, including, but not limited to, content from the header of the packet, a regular selection pattern, a random selection pattern, inclusion of the packet in a specific flow, use of the packet by a specific type of Application Session, which virtual machine sourced or is targeted by the packet, which external device is sourced or targeted by the packet, and/or heuristic determinations (e.g., packet sizes, timing relative to previous packets, entropy, and the like). In some policy examples multiple criteria may be weighed to determine whether the packet is of sufficient interest to be selected for inspection by the external security device.

If the packet is not selected for inspection (block 510, NO), the packet is delivered (block 525) to its intended destination virtual machine. If the packet is selected for inspection (block 510, YES), the packet is redirected (block 515) to the external security device using an egress tunnel. The tunnels described with respect to this method may be implemented using any suitable protocol, including, but not limited to, VLAN tunneling, VPN tunneling, GRE tunneling, IEEE 802.1ah tunneling, as described above.

A determination is then made (block 520) as to whether the external security device has delivered an indication to the host device that the packet is approved. If so (block 520, YES), the packet is delivered (block 525) to its intended destination virtual machine or external device. Otherwise, (block 520, NO), the packet is not delivered to the destination.

The indication from the security device that the packet has been approved may take different forms. As described previously, the security device may indicate that the packet is approved by returning the packet to the host device over a designated ingress tunnel. In alternative examples, the indication of approval may be a simple datagram message from the security device which references the packet and indicates whether the packet is approved. In such examples, the host device may store the packet in a buffer until the indication of approval is received from the security device and deliver the packet to its intended destination if the packet is approved. If no approval is received for a packet stored in the buffer after a specified period of time, or if the host device receives an indication from the security device that the packet is disapproved, the host device may drop the packet.

The method (500) shown in FIG. 5 may be performed for any and all packets addressed to or sourced from any and all virtual machines implemented by the virtual host. In alternative examples, only packets that are addressed to certain virtual machines may be selected for inspection by the external security device.

Figure 6:
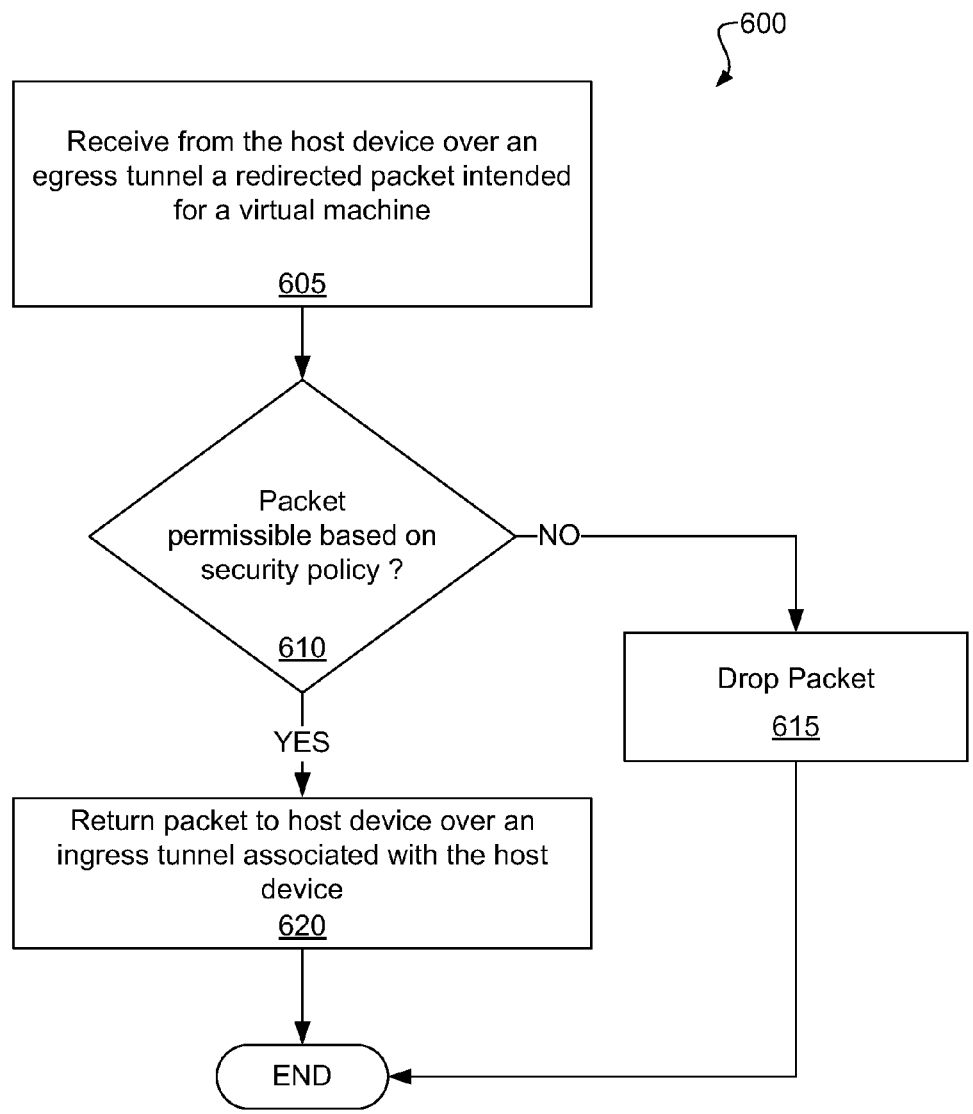
FIG. 6 is a flowchart diagram of an illustrative method of securing a virtual environment, according to one example of principles described herein.

FIG. 6 is a flowchart of another illustrative method (600) of securing a virtual environment according to the above principles. This method (600) may be performed, for example, by a security device external to the host device. In the method (600), the security device receives (block 605) from the host device over an egress tunnel associated with the host device a redirected packet intended for a virtual machine. The security device then makes a determination (block 610) as to whether the packet is permissible under security policy. The security policy may, for example, dictate that certain packets meeting certain criteria are permissible for transmission to their intended destinations and all other packets are considered impermissible. Alternatively, the security policy may, for example, dictate that packets meeting certain criteria are impermissible for transmission to their intended destinations and all other packets are permissible.

In some examples, the determination (block 610) of whether the packet is permissible under the security may include inspecting non-header contents of the packet (i.e., Deep Packet Inspection (DPI)) using advanced content-based filters. Such inspection may be based upon the contents of the packet or the assembled content of multiple packets into flows or application sessions.

If the packet is found (block 610, YES) to be permissible under the security policies implemented by the security device, the packet is returned (block 620) to the host device over an ingress tunnel associated with the host device. Otherwise (block 610, NO), the packet is dropped (block 615).

Figure 7:
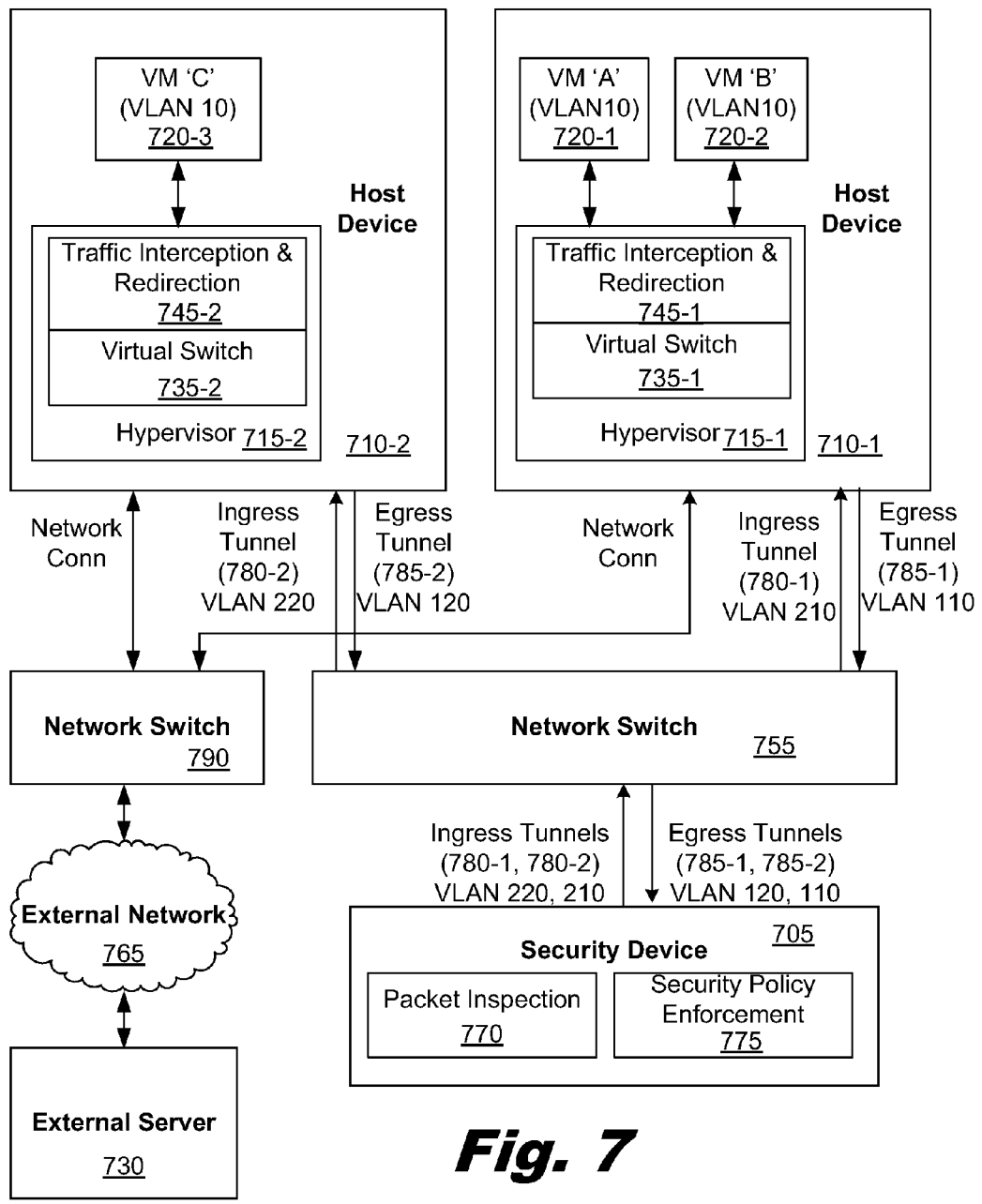
FIG. 7 is a block diagram of an illustrative virtual environment secured by an external security device, according to one example of principles described herein.

FIG. 7 shows a block diagram of an illustrative system (700) for securing a virtual environment using an external security device (705). In the system of FIG. 7, multiple host devices (710-1, 710-2) implement first, second, and third virtual machines (720-1, 720-2, and 720-3). Each host device (710-1, 710-2) runs a hypervisor (715-1, 715-2, respectively) that implements virtual switch modules (735-1, 735-2, respectively) and traffic interception and redirection modules (745-1, 745-2) consistent with the principles described in relation to FIG. 1.

The host devices (710-1, 710-2) are each connected to a network switch (790), which allows for the first, second, and third virtual machines (720-1, 720-2, 720-3) to be members of the same virtual Local Area Network (VLAN 10). Thus, even though the host devices (710-1, 710-2) are physically separate, the first, second, and third virtual machines (720-1, 720-2, 720-3) are able to communicate with each other as though they were all separate physical machines physically connected to the same Local Area Network (LAN). The Network Switch (790) also serves as the gateway to external network interfaces.

The external security device (705) in the system (700) exhibits similar functionality to that described in relation to the external security device (105) of FIG. 1. The security device (705) includes packet inspection and security policy enforcement modules (770, 775). In an alternate deployment, it is possible for the network switches (755, 790) to be implemented as a single network switch/router.

In the specific example of FIG. 7, VLAN tunnels are instantiated with the Network Switch (755) for each of the egress and ingress data-paths for each virtual host (710-1, 710-2). For example, the host device (710-1) utilizes VLAN 110 as the Egress tunnel. The security device (705) includes functionality to inspect traffic received on the egress tunnel (785-1) and return the packets to the host device on VLAN 210. The network switch (755) can be configured to combine the VLANs used for the egress and ingress tunnels into a single physical network connection (pursuant to IEEE 802.1q), before being delivered to the security appliance.

Figure 8:
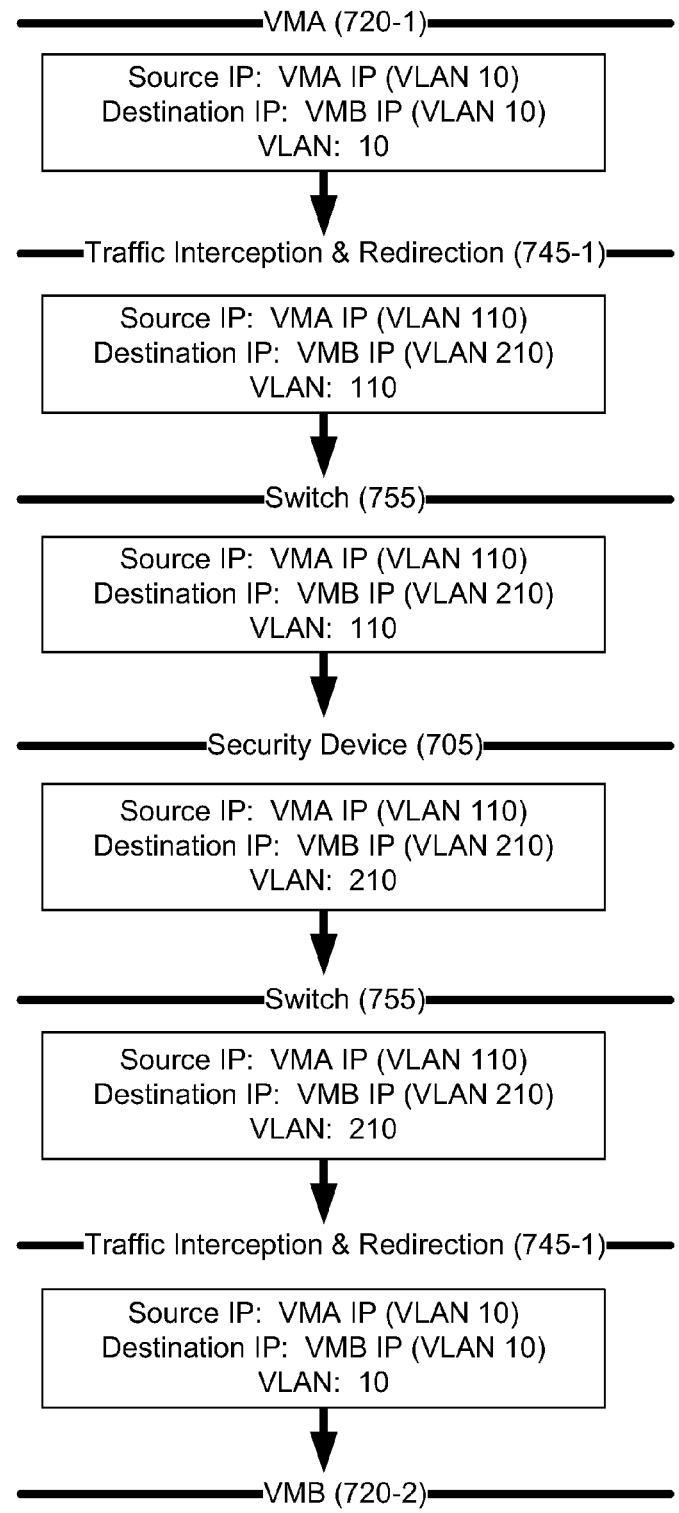
FIG. 8 is a diagram of an illustrative path taken by a packet transmitted between virtual machines in a virtual environment, according to one example of principles described herein.

FIG. 8 illustrates an illustrative path taken by a packet transmitted from the first virtual machine (720-1) to the second virtual machine (720-2) of FIG. 7 using VLAN tunneling. The first virtual machine (720-1) produces an outgoing packet on VLAN10 addressed to the IP and MAC addresses of the second virtual machine (720-2). This packet is intercepted by the traffic interception and redirection module (745-1) of the first host device (710-1). The traffic interception and redirection module (745-1), upon determining that the packet is a candidate for inspection by the security device, transmits the packet on the egress tunnel (785-1). Upon reception of the packet on the port configured as the egress tunnel (785-1), the network switch (755) forwards the packet to the Security Device (705), first pre-pending the 802.1q header to indicate the packet is using VLAN 110. The security device (705) will evaluate the packet and any associated network flow or application session, pursuant to the security policy of the system (700). If the packet is permissible, the security device (705) updates the VLAN 802.1q header to remove VLAN 110 and add VLAN 210, transmitting the return traffic on the Ingress tunnel port. Upon reception by the Network Switch (755), the switch will remove the VLAN tunnel header, returning the traffic to the host device (720-1) on the ingress tunnel port (780-1).

The virtual switch module (735-1) of the first host device (710-1) and the network switch (755) are configured to direct all packets transmitted on an egress tunnel (785-1) to the external security device (705). Thus, the security device (705) receives the packet on VLAN 110 and inspects the packet for permissibility based on network policy enforced by the external security device (705). If the packet is permissible, the security device transmits the packet back to the switch (755) on VLAN 210 (i.e. the ingress tunnel). The switch (755) directs the packet to the first host device (710-1), where the packet interception and redirection module (745-1) recognizes that the packet has been inspected and permitted by the external security device due to its receipt on VLAN 210 (i.e. the ingress tunnel). Because the packet has been permitted by the external security device, the traffic interception and redirection module (745-1) delivers the packet to the second virtual machine (720-2) on VLAN 10.

A similar process may occur for packets transmitted between virtual machines (720-1, 720-2, 720-3) implemented by different host devices (710-1, 710-2). For example, if the second virtual machine (720-2) were to transmit a packet to the third virtual machine (720-3), the packet would be intercepted and redirected at the first host device (710-1) to the security device (705) on VLAN 110 (i.e. the egress tunnel), inspected by the security device (705), retransmitted by the security device (705) on VLAN 210 (i.e. the ingress tunnel), intercepted at the traffic interception and redirection module (745-2) of the second host device (710-2), and directed to the third virtual machine (720-3) on VLAN 10.

Figure 9:
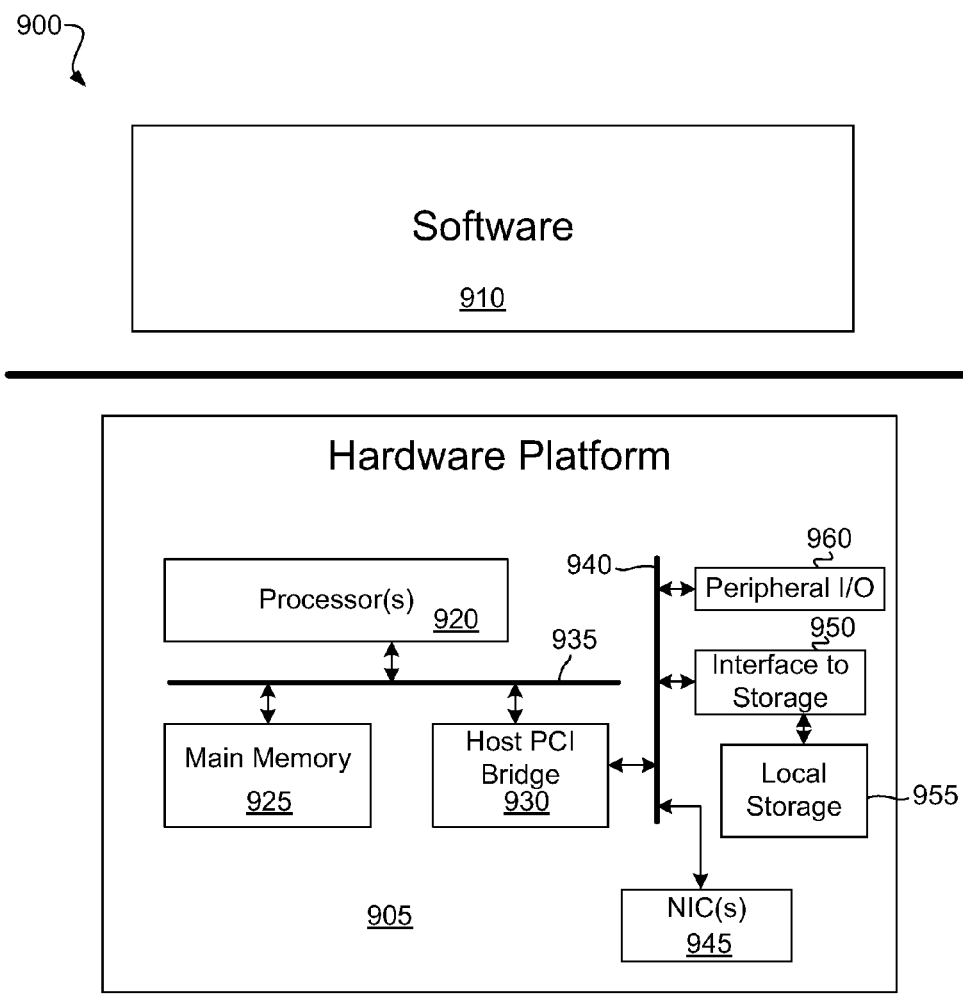
FIG. 9 is a block diagram of an illustrative hardware platform for a virtual environment or an external security device, according to one example of principles described herein.

FIG. 9 is a block diagram of an illustrative device (900) which may be used to implement a host device, a network switch, or an external security device consistent with the principles described in the present specification. In this illustrative device (900), an underlying hardware platform (905) executes software (910) to exhibit a desired functionality. As used in the present specification and in the appended claims, the term "software" includes firmware.

For example, if the illustrative device (900) is configured to implement a host device, the software may include at least hypervisor software and operating system software for one or more virtual machines. Additionally or alternatively, if the illustrative device (900) is configured to implement a network switch, the software may include switch software. Additionally or alternatively, if the illustrative device (900) is configured to implement an external security device, the software may include at least packet inspection software and security policy enforcement software.

The hardware platform (905) of the illustrative device (900) may include at least one processor (920) that executes code stored in the main memory (925). In certain embodiments, the processor (920) may include at least one multi-core processor having multiple independent central processing units (CPUs), with each CPU having its own L1 cache and all CPUs sharing a common bus interface and L2 cache. Additionally or alternatively, the processor (920) may include at least one single-core processor.

The at least one processor (920) may be communicatively coupled to the main memory (925) of the hardware platform and a host peripheral control interface bridge (PCI) (930) through a main bus (935). The main memory (925) may include dynamic non-volatile memory, such as random access memory (RAM). The main memory (925) may store executable code and data that obtainable by the processor (920) through the main bus (935).

The host PCI bridge (930) may act as an interface between the main bus (935) and a peripheral bus (940) used to communicate with peripheral devices. Among these peripheral devices may be one or more network interface controllers (945) that communicate with one or more networks, an interface (950) for communicating with local storage devices (955), and other peripheral input/output device interfaces (960).

It will be readily apparent to those having skill in the art that the present configuration of the hardware platform (905) is merely illustrative of one type of hardware platform (905) that may be used in connection with the principles described in the present specification. Moreover, it will be further understood that various modifications, additions, and deletions to the hardware platform (905) may be made while still implementing the principles described in the present specification.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A method of securing a virtual environment, said method comprising:
   in a security device external to a host device, receiving from said host device over an egress tunnel associated with said host device a redirected packet intended for a virtual machine implemented by said host device;
   determining whether said packet is permissible based on a security policy;

returning said packet to said host device over an ingress tunnel associated with said host device if said packet is permissible based on said security policy;
    if said packet is permissible based on said security policy, updating a Virtual Local Area Network (VLAN) header of said packet to remove a first VLAN and add a second VLAN; and
    returning said packet to said host device, via a network switch, over an ingress tunnel associated with said host device if said packet is permissible based on said security policy.

2. The method of claim 1, wherein determining whether said packet is permissible based on a security policy comprises inspecting content of said packet including content of said packet not found in a header for said packet.

3. The method of claim 1, wherein said packet is only returned to said host device over said ingress tunnel associated with said host device upon a determination that said packet is permissible based on said security policy, and, if said security policy does not permits said content of said packet, said packet is not returned by said security device to said host device over said ingress tunnel.

4. The method of claim 1, further comprising inspecting a network flow associated with said packet.

5. The method of claim 4, wherein said determination of whether said packet is permissible based on said security policy comprises determining whether said security policy permits said packet within a context of said network flow.

6. The method of claim 1, further comprising inspecting an application session associated with said packet.

7. The method of claim 6, wherein said determination of whether said packet is permissible based on said security policy comprises determining whether said security policy permits said packet within a context of said application session.

8. The method of claim 1, further comprising dropping said packet if said packet is not permissible based on said security policy.

9. A method securing a virtual environment, said method comprising:
    in a host device, intercepting a packet addressed to or sourced by a virtual machine implemented by said host device;
    redirecting said packet from said host device to a security device external to said host device through an egress tunnel;
    delivering said packet to an intended destination of said packet if said host device receives an indication from said security device that said packet is approved; and
    storing said packet in a buffer of said host device until said indication is received from said security device,
    wherein, if no indication is received from said security device for a specified period of time, said method further comprises said host device dropping a corresponding packet from said buffer.

* * * * *